US010756911B2

(12) United States Patent
Nayak et al.

(10) Patent No.: US 10,756,911 B2
(45) Date of Patent: *Aug. 25, 2020

(54) COST ESTIMATION ON A CLOUD-COMPUTING PLATFORM

(71) Applicant: International Business Machines Corporation, Armonk, NY (US)

(72) Inventors: Sachin M. Nayak, Bangalore (IN); John Kurian, Bangalore (IN); Badekila Ganesh Prashanth Bhat, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/976,087

(22) Filed: May 10, 2018

(65) Prior Publication Data

US 2019/0349210 A1 Nov. 14, 2019

(51) Int. Cl.
*H04L 12/14* (2006.01)

(52) U.S. Cl.
CPC ...... *H04L 12/1428* (2013.01); *H04L 12/1403* (2013.01)

(58) Field of Classification Search
CPC .............. H04L 12/1428; H04L 12/1403
See application file for complete search history.

(56) References Cited

U.S. PATENT DOCUMENTS

| 9,900,264 | B1* | 2/2018 | Chen | .................... H04L 47/783 |
| 2002/0178259 | A1* | 11/2002 | Doyle | .................... H04L 29/06 |
|  |  |  |  | 709/225 |
| 2006/0161503 | A1* | 7/2006 | Popescu | ............ G06Q 30/0283 |
|  |  |  |  | 705/400 |

(Continued)

FOREIGN PATENT DOCUMENTS

WO WO2016107510 7/2016

OTHER PUBLICATIONS

INFOSEC, "Http Verb Tempering: Bypassing Web Authentication and Authorization", https://resources.infosecinstitute.com/http-verb-tempering-bypassing-web-authentication-and-authorization/#gref, May 1, 2015 (Year: 2015).*

*Primary Examiner* — Umar Cheema
*Assistant Examiner* — James Ross Hollister
(74) *Attorney, Agent, or Firm* — Schmeiser, Olsen & Watts; Mark C. Vallone

(57) ABSTRACT

A cloud-management system intercepts API calls from a client application. Based on the expected amount of cloud resources required to service the API call, and given the terms of the client's billing plan, the system estimates the cost to service the call. The system embeds this cost into its response to the API call and the client application, or an IDE hosting the application, keeps a running total of API-related costs incurred by the application. The system can also run in an emulation mode, estimating the application's API resource-consumption costs without actually consuming cloud resources. In this mode, the system replaces each GET and PUT call in the intercepted API call with an equivalent HEAD call that does not consume resources. The system still, however, predicts the actual cost of the original API call by returning the cost of each original GET and PUT.

20 Claims, 5 Drawing Sheets

(56) References Cited

U.S. PATENT DOCUMENTS

| | | | |
|---|---|---|---|
| 2007/0169017 A1* | 7/2007 | Coward | G06F 8/51 717/136 |
| 2011/0265077 A1* | 10/2011 | Collison | G06F 8/71 717/172 |
| 2015/0312356 A1* | 10/2015 | Roth | G06F 11/3006 709/226 |
| 2015/0365348 A1* | 12/2015 | Matsuda | H04L 67/10 709/225 |
| 2016/0112475 A1* | 4/2016 | Lawson | H04L 65/403 709/204 |
| 2016/0225042 A1 | 8/2016 | Tran et al. | |
| 2016/0247238 A1* | 8/2016 | Kunapuli | G06Q 40/12 |
| 2017/0064038 A1* | 3/2017 | Chen | G06F 16/951 |

* cited by examiner

COST ESTIMATION ON A CLOUD-COMPUTING PLATFORM

BACKGROUND

The present invention relates in general to cloud-management platforms and in particular to user-activity monitoring by a cloud-management application.

An important requirement for today's cloud-computing platforms is the ability to determine billing information for clients that use a cloud service.

One way in which cloud-computing implementations may price their services is to set fees as a function of each user's API-call usage. Such billing systems, however, cannot easily provide accurate billing estimates, making it difficult for clients to predict and compare cloud-computing costs. Similarly, dynamic characteristics of a client's API usage make it difficult to derive and report the true costs—either to the client or to the service-provider—of specific tasks in an interactive, real-time cloud-computing environment.

For example, a cloud service that simply charges a flat $10 fee for 10,000 API calls does not account for potentially great differences in resource consumption between different types of API calls. Similarly, it can be difficult for a cloud-management platform to derive and display actual user billings in real time when the user subscribes to a promotional plans that offers a certain number of introductory API calls at a reduced rate during a particular time period or that clusters different types of API calls or certain quantities of API calls into different billing tiers.

In all these cases, merely tracking a user's actual number of API calls cannot accurately predict the user's true billings and does not accurately identify the service-provider's true cost to service those calls.

SUMMARY

An embodiment of the present invention is a cloud-management system of a cloud-computing platform comprising a processor, a memory coupled to the processor, and a computer-readable hardware storage device coupled to the processor, the storage device containing program code configured to be run by the processor via the memory to implement a method for improved cost estimation on the cloud-computing platform, the method comprising:

the processor intercepting an API call that requests services from the cloud-computing platform, where the API call is issued by a client application provisioned in a virtualized computing environment hosted by the cloud-computing platform, where the API call is characterized as a particular type of API call, and where cloud-resource consumption costs incurred by servicing the API call are billed by the cloud-management system to a client account;

the processor retrieving client data from a cloud-system data repository, where the client data identifies terms of a billing plan associated with the client account;

the processor predicting as a function of the client data a billing cost that would be incurred by servicing the particular type of API call under the terms of the billing plan; and the processor embedding the billing cost as metadata into a response to the API call.

Another embodiment of the present invention is a method for improved cost estimation on a cloud-computing platform, the method comprising:

intercepting, by a cloud-management system of the cloud-computing platform, an API call that requests services from the cloud-computing platform, where the API call is issued by a client application provisioned in a virtualized computing environment hosted by the cloud-computing platform, where the API call is characterized as a particular type of API call, and where cloud-resource consumption costs incurred by servicing the API call are billed by the cloud-management system to a client account;

retrieving client data, by the cloud-management system, from a cloud-system data repository, where the client data identifies terms of a billing plan associated with the client account, predicting as a function of the client data, by the cloud-management system, a billing cost that would be incurred by servicing the particular type of API call under the terms of the billing plan; and embedding, by the cloud-management system, the billing cost as metadata into a response to the API call.

Yet another embodiment of the present invention is a computer program product, comprising a computer-readable hardware storage device having a computer-readable program code stored therein, the program code configured to be executed by a cloud-management system of a cloud-computing platform comprising a processor, a memory coupled to the processor, and a computer-readable hardware storage device coupled to the processor, the storage device containing program code configured to be run by the processor via the memory to implement a method for improved cost estimation on a cloud-computing platform, the method comprising:

the processor intercepting an API call that requests services from the cloud-computing platform, where the API call is issued by a client application provisioned in a virtualized computing environment hosted by the cloud-computing platform, where the API call is characterized as a particular type of API call, and where cloud-resource consumption costs incurred by servicing the API call are billed by the cloud-management system to a client account;

the processor retrieving client data from a cloud-system data repository, where the client data comprises: terms of a billing plan associated with the client account, an estimate of an amount of cloud resources expected to be consumed by servicing an API call of the particular type, and a relative cost of the amount of cloud resources;

the processor predicting as a function of the client data a billing cost that would be incurred by servicing the particular type of API call under the terms of the billing plan; and the processor embedding the billing cost as metadata into a response to the API call.

DETAILED DESCRIPTION

Figure 1:
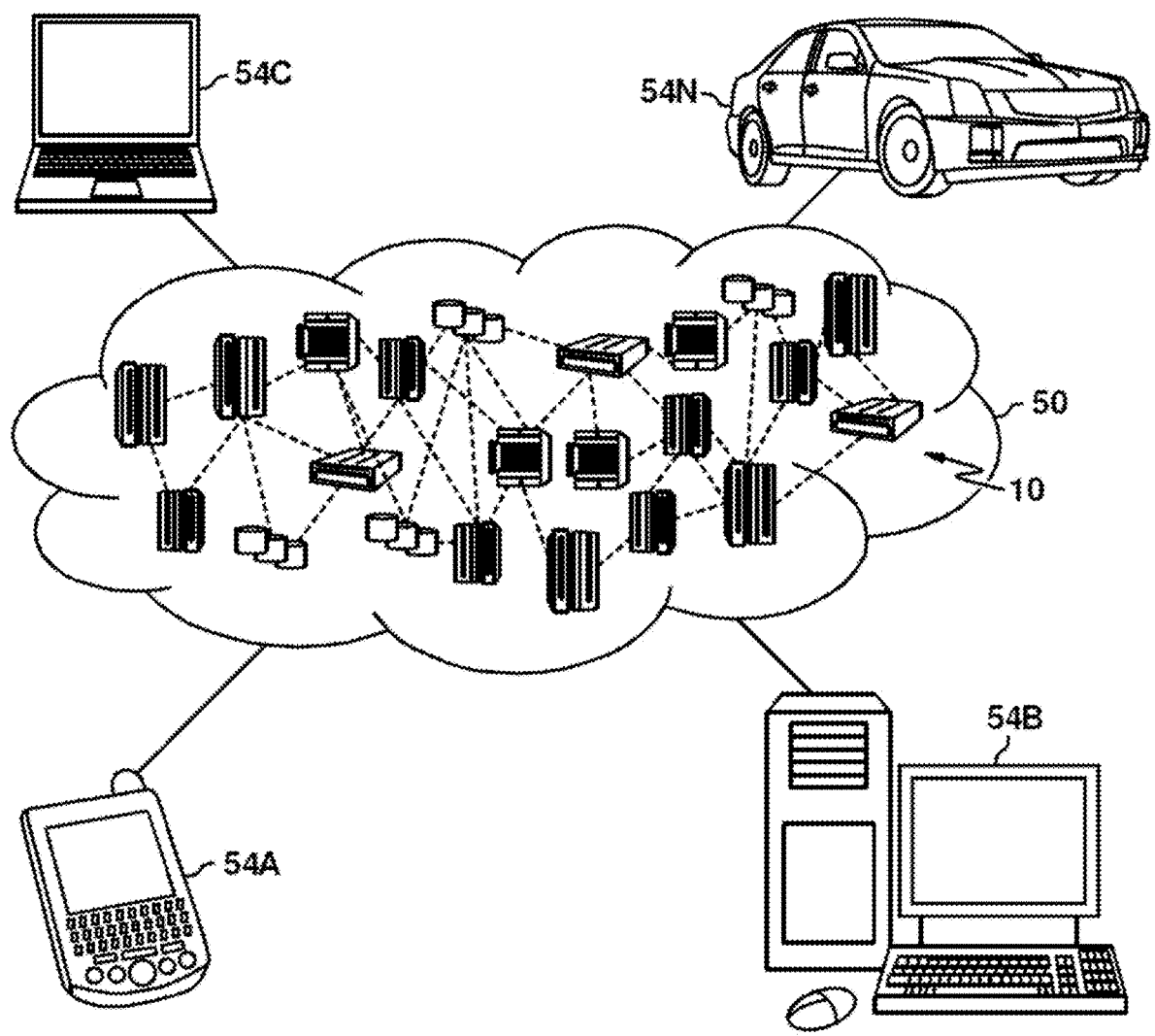
FIG. 1 depicts a cloud computing environment according to an embodiment of the present invention.

Embodiments of the present invention comprise systems and methods for an improved cloud-management platform that is capable of more quickly and accurately monitoring and determining fees to be billed to a user of services hosted by a cloud-computing environment.

As described in the BACKGROUND, when a cloud-computing platform bills a client as a function of that client's API usage, known cloud-management technology is unable to estimate, monitor, or report the client's cost to use a cloud-computing service while the client is working within a hosted cloud-computing environment. Instead, the client receives a statement at the end of a billing period listing fees that may be unexpectedly high or that may not reflect a service provider's true cost.

For example, a cloud pricing model that derives a monthly billing as a simple function of a user's total number of API calls cannot reliably compensate a service provider for the true cost of servicing those API calls. The amount of resources consumed by various types of API calls varies greatly, making a straightforward API-call count an inadequate way to determine the service provider's cost to service the customer.

A more nuanced billing system, however, may consider additional parameters that allow a service provider to more accurately measure the actual resource costs incurred by the user's API calls. Such a system might, for example, distinguish between different types of API calls, charging more for calls that consume greater storage space or computing power, that themselves trigger other API calls, or that require new virtual resources to be provisioned.

Accounting for such considerations in real time are generally beyond the scope of billing components and user interfaces comprised by current cloud-management technologies. These types of billing models require detailed after-the-fact accounting to determine a user's cumulative amount of resource usage. Because much of the data needed to make such a determination is not available while an API call is being serviced, this type of mechanism cannot be used to interactively report usage costs to users.

This is a significant drawback of current cloud-management systems and is an intrinsic limitation of the architecture of such systems. A cloud-management platform simply cannot track actual magnitudes of each type of resource usage incurred by each API call, and instead must infer cumulative usage over an extended time period by analyzing periodically aggregated summary logs.

This is a significant problem for developers that wish to estimate cloud-computing costs when budgeting the cost of a projected project or when attempting to select a most cost-effective pricing plan, development application, interactive development environment (IDE), programming platform, or development methodology. Without the ability to estimate the cost of various alternatives, it is impossible for the developer to select the lowest-cost approach.

This deficiency of current cloud-management platforms is also a problem for users who desire to limit variable cloud-service costs. Today's cloud-management systems could conceivably report estimated usage costs to users subscribed to a simple per-call billing plan, but it would be impossible for a current cloud-management platform to determine how many resources are being consumed and report a running total.

Embodiments of the present invention improve current cloud-management systems by addressing this problem, which arises from architectural limitations of current cloud-management technology. These embodiments implement this improvement by adding a new API-server module to current cloud-management systems that allows the capture and publication of resource-consumption statistics as metadata packaged with each API response. This metadata can then be aggregated and reported by an IDE client plug-in or by another type of application plug-in or by additional components of the cloud-management platform. In some embodiments, the present invention may be implemented by adding a novel "cloud API" layer to existing cloud-management stacks. This cloud API layer can intercept API calls and append consumption metadata to the cloud platform's response to each API call.

Regardless of implementation details, however, all embodiments improve the operation of known cloud-management systems in a manner that is not well-understood, routine, conventional activity known by skilled artisans in the field of cloud-computing.

Figure 4:
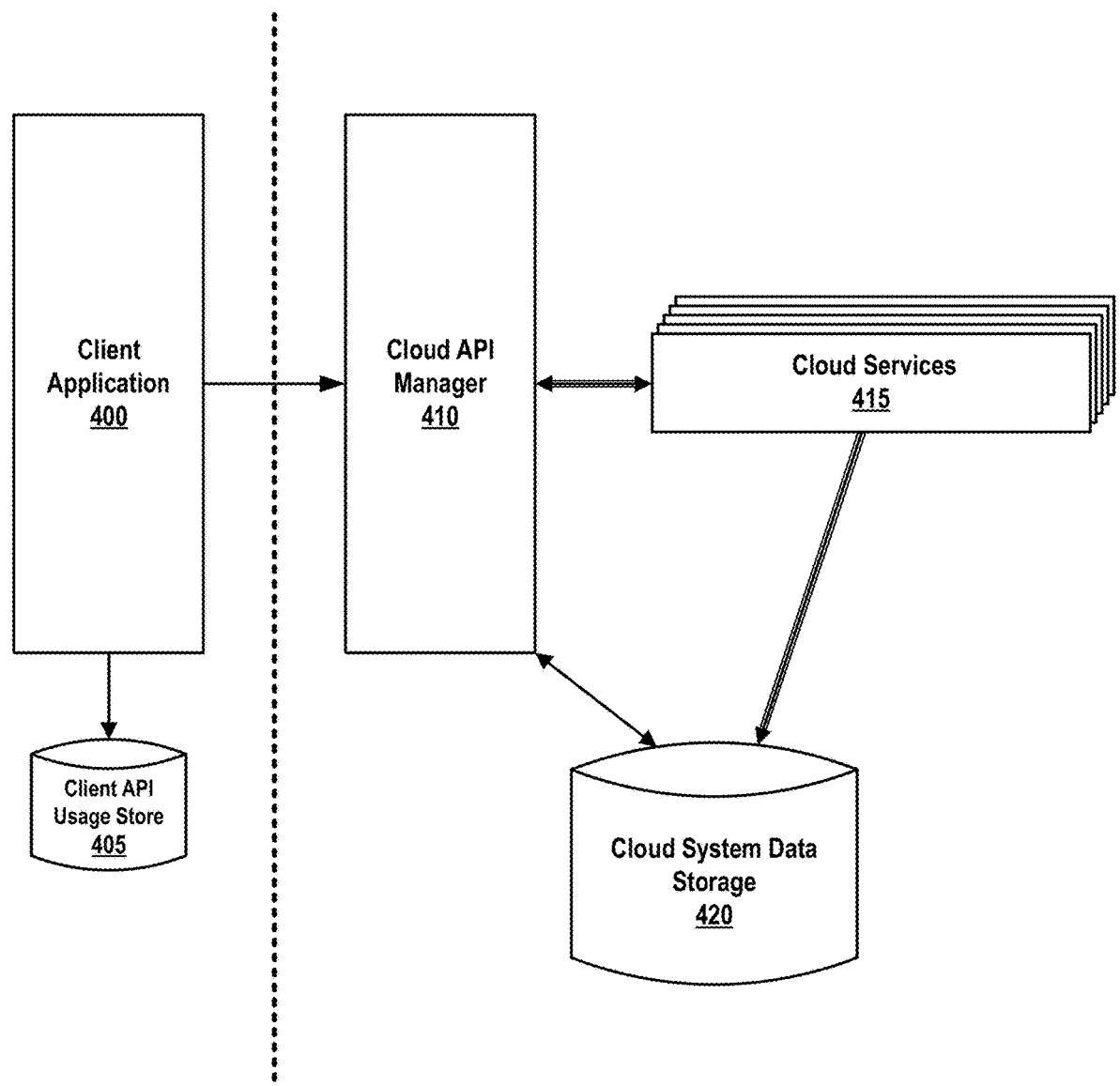
FIG. 4 shows a high-level architecture of a system for improved cost estimation on a cloud-computing platform in accordance with embodiments of the present invention.
Figure 5:
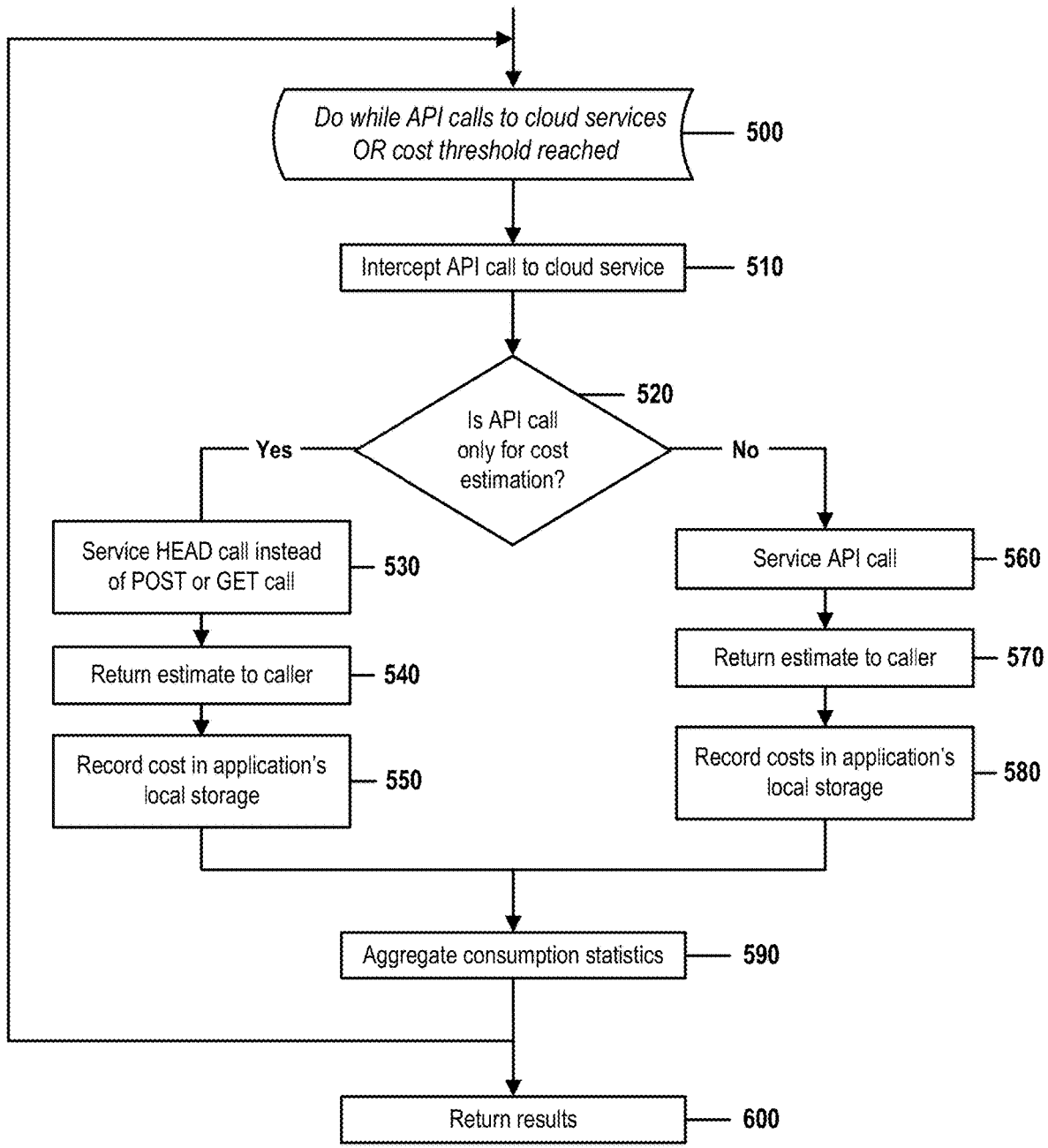
FIG. 5 is a flow chart that illustrates steps of a method for improved cost estimation on a cloud-computing platform in accordance with embodiments of the present invention.

Embodiments and examples of the present invention are described in greater detail in FIGS. 4 and 5.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
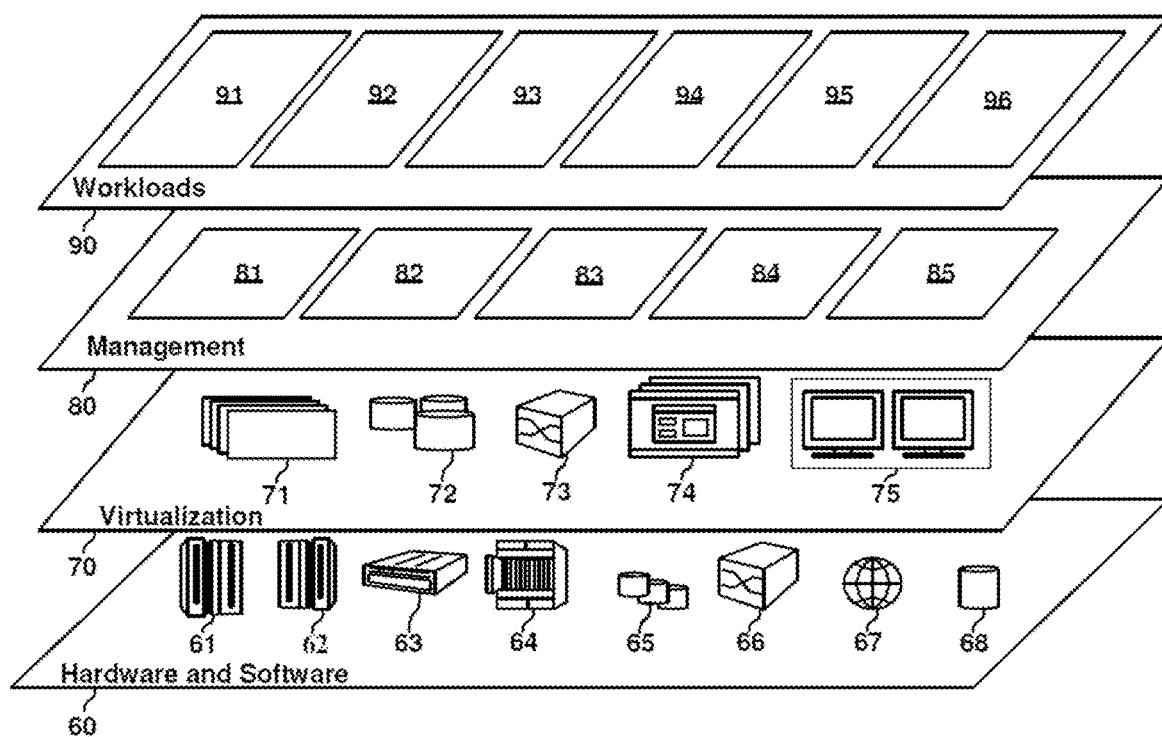
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of complex cost estimation of cloud-computing services 96.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
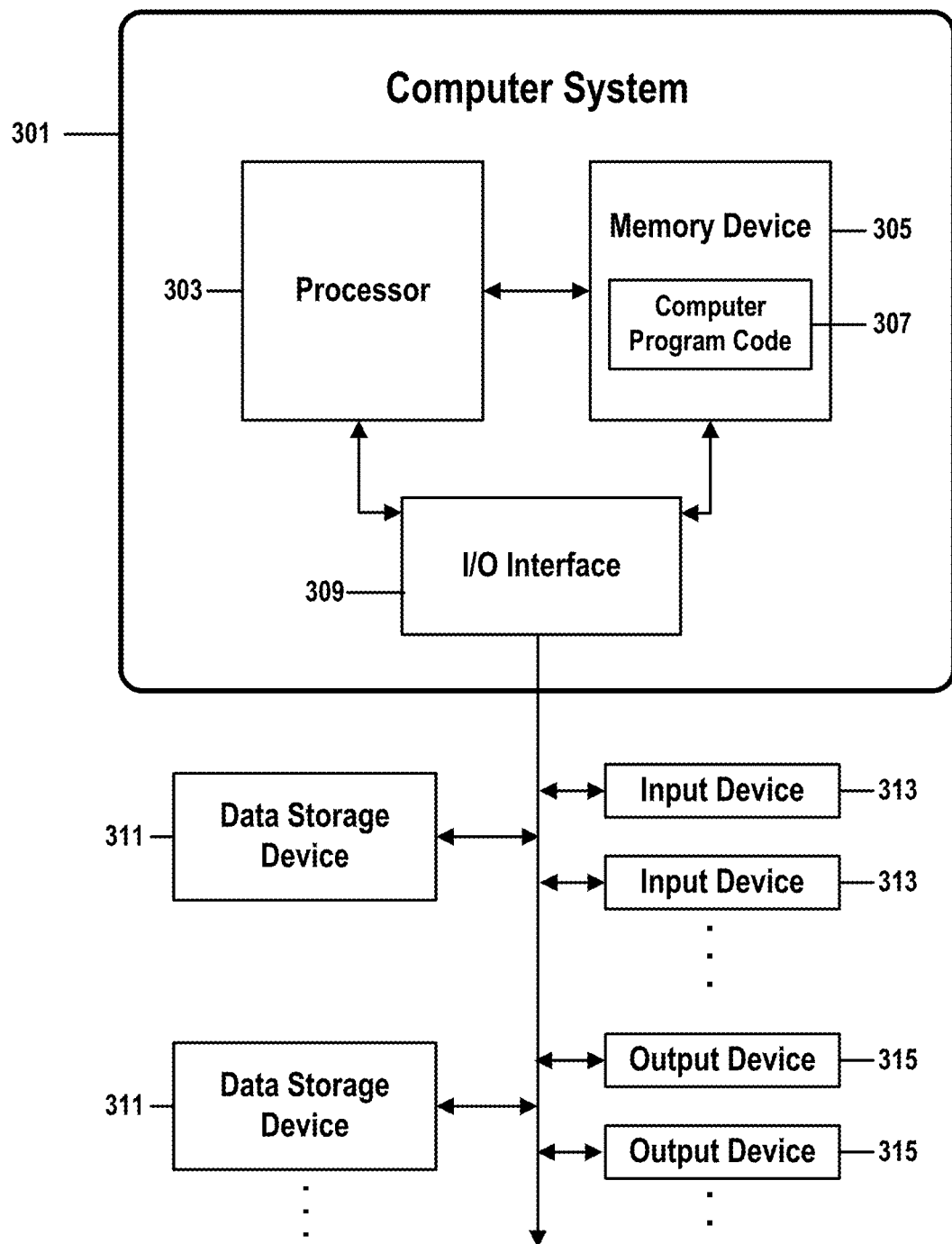
FIG. 3 shows the structure of a computer system and computer program code that may be used to implement a method for improved cost estimation on a cloud-computing platform in accordance with embodiments of the present invention.

FIG. 3 shows a structure of a computer system and computer program code that may be used to implement a method for improved cost estimation on a cloud-computing platform in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for improved cost estimation on a cloud-computing platform in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for improved cost estimation on a cloud-computing platform.

Any of the components of the present invention could be created, integrated, hosted, maintained, deployed, managed, serviced, supported, etc. by a service provider who offers to facilitate a method for improved cost estimation on a cloud-computing platform. Thus the present invention discloses a process for deploying or integrating computing infrastructure, comprising integrating computer-readable code into the computer system 301, wherein the code in combination with the computer system 301 is capable of performing a method for improved cost estimation on a cloud-computing platform.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for improved cost estimation on a cloud-computing platform may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for improved cost estimation on a cloud-computing platform is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

FIG. 4 shows an architecture of a system for improved cost estimation on a cloud-computing platform in accordance with embodiments of the present invention. FIG. 4 shows elements 400-420. In certain client/server-based embodiments (in certain virtual client-server topologies provisioned on a virtualized computing platform), objects 400 and 405 may be considered to be located on the client side of the client/server architecture and objects 410-420 may be considered to be located on the server side of the client/server architecture.

Client application 400 is a virtualized software application running in a cloud-computing environment. Application 400 makes API calls to its host operating system, which are serviced by components of the virtualized cloud platform on which the application and operating system are provisioned.

API usage store 405 is a local database associated with client application 400, such as a virtual hard drive, that stores information specific to application 400's API usage.

Cloud API manager 410 is a novel component of the cloud-management platform that intercepts each API call of application 400 and inserts metadata into corresponding API responses. This metadata identifies user data and API usage information.

In some embodiments, cloud API manager 410 may also help maintain the contents of cloud system data storage 420 by storing costs or characteristics of each API call in the system data storage 420.

Cloud API manager 410 may be implemented as a layer of a cloud-management stack, as an independent component or service of a cloud-computing platform, as a component of a client application, as a component of a cloud service, or in any other form known in the art.

Cloud services 415 each provide a service of the cloud-computing platform. The cloud responds to each API call of application 400 by providing one or more services 415 to the calling application 400.

Cloud system data storage 420 is a data repository used by the cloud-management platform to globally store information about each cloud user/client and about each user's API usage. This system storage data is updated by each cloud service 415 whenever that service 415 services a user API call.

Cloud storage 420 may, for example, store terms of each user's billing plan. A billing plan may, for instance, specify a pre-defined charge for each type of API call, or may organize possible API calls into "heavy," "medium," and "light" categories or resource consumption, associating each category of API calls with a distinct category-specific per-call fee as a function of an amount of resources consumed by each call.

In one example, a cloud system data storage repository 420 might store: i) a listing of the cloud resources consumed by each possible API call; ii) a listing of billing plans, where each billing plan assigns a specific, predefined price each API call that consumes a specific amount or combination of cloud resources; and iii) a listing of the billing plan or plans associated with each user account, including any promotional offers or user-specific discounts.

Regardless of the exact type of data stored in cloud system data storage 420, all embodiments of the present invention will be able to use information stored in the cloud storage repository 420 to estimate a specific user's cost when an application owned by that user calls a particular API.

FIG. 5 is a flow chart that illustrates the steps of a method for improved cost estimation on a cloud-computing platform in accordance with embodiments of the present invention. FIG. 5 contains steps 500-600 which may be performed by embodiments that incorporate the structures of FIGS. 2-4.

In some embodiments, the method of FIG. 5 is performed only if the client application 400 or a user of client application 400, an integrated development environment (IDE), or another type of service requestor, has enabled the API consumption-tracking functionality of the present invention. This enablement may be implemented by any means known in the art, such as by setting a variable "APIConsumptionTracking." If tracking has not been enabled, the novel features of the present invention are not performed and the cloud services the API call in a traditional manner.

One class of embodiments of the method of FIG. 5 is performed during an application-development procedure, to support a developer testing an application 400 under development in an integrated development environment (IDE). In such embodiments, the system computes, records, and aggregates the cost of each API call made by application 400, but does not actually service the application's API calls. This allows the developer to estimate the real-world cost to run application 400. If the developer sets a threshold cost, the system may continue to estimate API-call costs until the threshold is reached, allowing the developer to estimate types of usage and durations of time during which use of the application 400 will not exceed a budgetary constraint.

Another class of embodiments is performed during actual production usage of application 400. In such embodiments, the system derives real costs incurred by actually running each API call made by application 400. Some embodiments of this type may add features like a real-time display or live feed of current or cumulative API-consumption costs, or alarms that warn users when their API-consumption costs exceed various types of thresholds.

Many other embodiments of the present invention are possible, wherever it is necessary to, interactively or not, monitor real-world consumption costs incurred by an application's or service's API calls in a computing environment. Although examples and embodiments described in this document are limited to virtualized computing environments, such as cloud-computing platforms, embodiments of the present invention are flexible enough to provide analogous cost-estimation benefits in any computing environment where an application must make API calls or system calls to extrinsic server entities.

In some embodiments, steps 510-590 are performed repeatedly, once for each API call intercepted from client application 400. In such embodiments, step 500 initiates this iterative procedure, repeating the procedure until either no more API calls are received or until a total accumulated API-consumption cost exceeds a threshold value.

In step 510, cloud API manager 410 intercepts, through means known in the art, an API call made by client application 400. Depending on embodiment, this API call may have been received directly from application 400 or from an IDE that is hosting and testing an instance of application 400.

In some embodiments, a novel module of application 400 or of the IDE may have substituted a HEAD API call for a GET call or a POST call that would normally have been made by application 400. This substitution may have been performed because application 400, the IDE, or another software component hosted by the cloud-computing environment has been configured to require only an estimate of API-consumption costs, rather than an actual performance of analogous API calls. Such a configuration may be made when, for example, application 400 is being run only for the purpose of estimating actual API consumption costs.

In traditional API calls, such as a call to the standard REST (Representational State Transfer) API, a GET request is used to retrieve information from an information source, such as retrieving a URL from a Web server. Conversely, a POST request is used to send data to a server, such as submitting user input entered into an HTML forms. Both methods consume system resources and are capable of transferring significant amounts of data across a network or making significant updates to an information repository like a database.

Embodiments of the present invention may, however, substitute a HEAD request for each GET or POST request comprised by an API call intercepted in step 510. A response to a HEAD request comprises a status line and header section identical to those returned by a GET request. However, a response to a HEAD request does not include the body of data comprised by a response to a GET request. In other words, a HEAD request returns a description of a response to an equivalent GET request (such as a relatively small amount of metadata), but does not consume the resources required to fully service that GET request. The difference is especially dramatic when a GET request is intended to return large media files, like images, entire documents, Web pages, or videos.

In step 520, the cloud API manager 410 determines whether the intercepted API call is a HEAD call that should merely emulate the consumption costs of a GET or POST API call. If the API call is a GET or POST call that is to actually be serviced, the method of FIG. 5 continues with steps 560-580. But if the system is configured to merely estimate a cost to service the API call, then the method of FIG. 5 continues instead with steps 530-550.

This configuration may be determined by any means known in the art, either by a client-side method prior to step 510 or by a server-side component during a later step. These means may, for example, comprise a stored configuration file of application 400, a plug-in component of an IDE that hosts application 400, an internal setting of cloud API manager 410, or a configuration of another component of the underlying cloud-management platform.

In step 530, if the system is configured to operate in an emulation mode or to otherwise only estimate resource-consumption costs of the intercepted API call, cloud API manager 410 substitutes an HTTP HEAD request for any GET or POST request comprised the API call received in step 510. If the receive API call is already a HEAD call, cloud API manager 410 performs no further substitution.

Embodiments of the present invention are flexible enough to accommodate implementations where this substitution is made at an earlier point in the procedure of FIG. 5, if desired by an implementer. For example, the HEAD-call substitution may be made automatically on the client side of the system architecture shown in FIG. 4, such as by an IDE plug-in or an emulation module provided by the cloud service provider. In such a case, the method of FIG. 5 would not perform steps 520-550, since the system could fully service all received API calls, including calls that had already been converted to HEAD calls before being received by cloud API manager 410.

The cloud API manager 410 then forwards the HEAD request to one or more API servers 415 configured to access the requested cloud services. These servers, through means known in the art, perform tasks required in order to service the HEAD request. In general, these tasks comprise returning a header and status line to the cloud API manager 410, but omitting the body of a response that would be returned by a GET request or submitted by a POST request.

In step 540, the Cloud API manager 410 queries the cloud system data storage repository 420 in order to determine a normal production-environment cost that would have been associated with the original API call, had the API call not been converted to a HEAD call.

This estimated cost may be a function of the specific types of services that would have been consumed by the original API call, including the storage and network resources that would have been consumed by the body of the call or by the body of the response, had the HEAD call not been substituted for a GET or POST call.

The estimated cost may also be a function of which billing plan is associated with the user account for the hosted virtual environment of client application 400. For example, a billing plan may charge a flat rate for each API call, or may specify a number of pricing tiers that assign a specific cost to any API call that falls within a certain tier. In such a plan, an API call may be assigned to a particular tier as a function of the type or amount of cloud resources consumed by servicing that API call.

In other examples, a billing system may associate a general level or resource consumption with each type or sub-type of API call. In some cases, different amounts of resource consumption may even be associated with the same API call, depending on which client application 400 invoked the call.

For example, a stock-tracking application 400 may typically consume fewer resources when it makes a certain type of data-handling API call than would a weather application 400 because the weather application 400 would normally require a response that comprises a much larger body of data than would the stock tracking application 400. In such a case, the cloud system data storage 420 might identify a first estimated cost to service the data-handling API call if the call was made by the stock-tracking application 400 and would identify a second estimated cost to service the data-handling API call if the call was made by the weather application 400.

In a most general case, cloud system data storage 420 might comprise a database that returns an estimated API resource-consumption cost as a function of: i) the type of API call and sub-type of API call; ii) the client application 400 that invoked the API call; iii) the user account associated with client application 400; and iv) terms of the billing plan associated with the user account, including user-specific terms.

The cloud API manager 410 then estimates resource-consumption costs of the API call as a function of the user details and API details retrieved from the cloud system data storage 420. This estimated cost is embedded into the header of the HEAD-call response as metadata and returned by cloud API manager 410, through known methods of client-server communications, to client application 400.

In step 550, the API consumption costs are extracted from the header and stored in the application 400's API usage store 405. This extraction and storage may be performed by the cloud API manager 410, but may also be performed by a client-side module, such as the IDE plug-in or by a component of the present invention implemented as an internal module of the client application 400.

In step 560, if the cloud API manager 410 determined in step 520 that the intercepted API call is not a HEAD call, and that the system is not otherwise running in an emulation mode, the cloud API manager 410 submits the intercepted API call in a normal manner to the API server of the API service 415. The resulting response, unlike the response of steps 530-550, will contain a body section.

In step 570, in a procedure analogous to that of step 540, the Cloud API manager 410 queries cloud system data storage device 420 and derives from the retrieved user data resource-consumption costs incurred by servicing the original API call, including all GET and POST calls.

The cloud API manager 410 then estimates resource-consumption costs of the API call as a function of the user details and API details retrieved from the cloud system data storage 420. This estimated resource-consumption cost of the API call is embedded into the header of the API-call response as metadata and returned by cloud API manager 410, through known methods of client-server communications, to client application 400.

In step 580, much like step 550, the API consumption costs are extracted from the API response header and stored in application 400's API usage store 405. As in step 550, this extraction and storage may be performed by the cloud API manager 410, but may also be performed by a client-side module, such as the IDE plug-in or by a component of the present invention implemented as an internal module of the client application 400.

In step 590, a client-side module of the present invention (such as an IDE plug-in or a customized component of client application 400) incorporates the received consumption costs with costs that had previously been stored in the client API usage store 405 during earlier iterations of the iterative procedure of steps 500-590.

If, for example, only a total cost of each API is tracked as a single number, that number may be added to the stored sum of all previously computed costs. If the stored costs are organized into separate sub-categories, the newly received costs may be added to each sub-category sum. In some embodiments, a weighting may be assigned to each such sub-category and a total API cost may be derived as a weighted sum of each sub-category sum. Other methods of computing a total cost are possible, as are known in the art.

In some cases, costs may be aggregated over a certain period of time. For example, a developer may want to determine whether a certain application 400 incurs higher API-consumption costs during typical usage patterns at different times of day. In such a case, an embodiment of the present invention might identify a distinct aggregate cost for each hour of a sequence of hour-long measurement periods. In this manner, a developer or potential user can estimate a total API-consumption cost of running an application during production under various types of usage patterns.

The iterative procedure of steps 500-590 concludes when a predetermined, implementation-dependent condition is met. For example, an embodiment may be run for 24 hours in order to gather enough data to provide a statistically meaningful cost result. In another case, an embodiment may be configured to run until an aggregated sum of API consumption costs reaches a certain threshold value. In this way, a user may be made aware that it is approaching, or has exceeded, a contractual or budgetary computing-cost limit.

In yet other embodiments, the procedure of step 500-590 may be performed for only one iteration, or for another fixed number of iterations, and then restarted after step 600 returns updated cost results to a user. Such an implementation would allow the embodiment to interactively provide users a live feed of a running total of API-consumption costs.

In step 600, the IDE or client application 400 displays or otherwise communicates to a user, or to a downstream software application, the API-consumption costs derived during the most recent iteration of step 590. This display or communication may be performed by any means known in the art, such as in an interactive onscreen dashboard, in a status area of an IDE, or as a message sent to a user's computer or mobile device.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. A cloud-management system of a cloud-computing platform comprising a processor, a memory coupled to the processor, and a computer-readable hardware storage device coupled to the processor, the storage device containing program code configured to be run by the processor via the memory to implement a method for improved cost estimation on the cloud-computing platform, the method comprising:

the processor intercepting an API (Application Programming Interface) call that requests services from the cloud-computing platform, where the API call is issued by a client application provisioned in a virtualized computing environment hosted by the cloud-computing platform, where the API call is characterized as a particular type and sub-type of API call, where the particular sub-type of API call indicates whether servicing the API call will trigger other API calls and whether servicing the API call will require a new virtual resource to be provisioned, and where cloud-resource consumption costs incurred by servicing the call are billed by the cloud-management system to a client account;

the processor retrieving client data from a cloud-system data repository, where the client data identifies terms of a billing plan associated with the client account;

the processor predicting as a function of the client data a billing cost that would be incurred by servicing the particular type of API call under the terms of the billing plan; and the processor embedding the billing cost as metadata into a response to the API call.

2. The system of claim 1, where the client data further comprises:

an estimate of an amount of cloud resources expected to be consumed by servicing an API call of the particular type, and a relative cost of the amount of cloud resources.

3. The system of claim 1, further comprising:

the processor determining that the client application is configured to run in an emulation mode that does not require the cloud-management system to service GET and POST API calls;

the processor revising the API call by substituting HEAD calls for all GET and POST calls comprised by the intercepted API; and the processor forwarding the revised API call to a cloud service.

4. The system of claim 3, where the predicted billing cost is a cost to service the intercepted API call, prior to the revising.

5. The system of claim 3, where the response is a response to the revised API call, comprising a header section, a status section, but no body section, and where the header section comprises the embedded billing-cost data.

6. The system of claim 1, where the API call, under direction of a software developer of the client application, is generated by a plug-in component of an integrated development environment (IDE) within which the client application is running, and where the plug-in component is provided by the cloud-management system.

7. The system of claim 1, further comprising:

the processor adding the billing cost to a cumulative total of previously predicted billing costs associated with previous API calls made by the client application;

the processor storing the resulting total billing cost in a client API usage store that is associated with the client application; and the processor determining whether the resulting total billing cost has exceeded a threshold value.

8. A method for improved cost estimation on a cloud-computing platform, the method comprising:

intercepting, by a cloud-management system of the cloud-computing platform, an API call that requests services from the cloud-computing platform, where the API (Application Programming Interface) call is issued by a client application provisioned in a virtualized computing environment hosted by the cloud-computing platform, where the API call is characterized as a particular type and sub-type of API call, where the particular sub-type of API call indicates whether servicing the API call will trigger other API calls and whether servicing the API call will require a new virtual resource to be provisioned, and where cloud-resource consumption costs incurred by servicing the API call are billed by the cloud-management system to a client account;

retrieving client data, by the cloud-management system, from a cloud-system data repository, where the client data identifies terms of a billing plan associated with the client account;

predicting as a function of the client data, by the cloud-management system, a billing cost that would be incurred by servicing the particular type of API call under the terms of the billing plan; and embedding, by the cloud-management system, the billing cost as metadata into a response to the API call.

9. The method of claim 8, where the client data further comprises:

an estimate of an amount of cloud resources expected to be consumed by servicing an API call of the particular type, and a relative cost of the amount of cloud resources.

10. The method of claim 8, further comprising:

determining, by the cloud-management system, that the client application is configured to run in an emulation mode that does not require the cloud-management system to service GET and POST API calls;

revising the API call, by the cloud-management system, by substituting HEAD calls for all GET and POST calls comprised by the intercepted API; and forwarding, by the cloud-management system, the revised API call to a cloud service.

11. The method of claim 10, where the predicted billing cost is a cost to service the intercepted API call, prior to the revising.

12. The method of claim 10, where the response is a response to the revised API call, comprising a header section, a status section, but no body section, and where the header section comprises the embedded billing-cost data.

13. The method of claim 8, where the API call, under direction of a software developer of the client application, is generated by a plug-in component of an integrated development environment (IDE) within which the client application is running, and where the plug-in component is provided by the cloud-management system.

14. The method of claim 8, further comprising:

adding, by the cloud-management system, the billing cost to a cumulative total of previously predicted billing costs associated with previous API calls made by the client application;

storing the resulting total billing cost, by the cloud-management system, in a client API usage store that is associated with the client application; and determining, by the cloud-management system, whether the resulting total billing cost has exceeded a threshold value.

15. The method of claim 8, further comprising providing at least one support service for at least one of creating, integrating, hosting, maintaining, and deploying computer-readable program code in the computer system, wherein the computer-readable program code in combination with the computer system is configured to implement the intercepting, the retrieving, the predicting, and the embedding.

16. A computer program product, comprising a computer-readable hardware storage device having a computer-readable program code stored therein, the program code configured to be executed by a cloud-management system of a cloud-computing platform comprising a processor, a memory coupled to the processor, and a computer-readable hardware storage device coupled to the processor, the storage device containing program code configured to be run by the processor via the memory to implement a method for improved cost estimation on a cloud-computing platform, the method comprising:

the processor intercepting an API (Application Programming Interface) call that requests services from the cloud-computing platform,
where the API call is issued by a client application provisioned in a virtualized computing environment hosted by the cloud-computing platform,
where the API call is characterized as a particular type and sub-type of API call,
where the particular sub-type of API call indicates whether servicing the API call will trigger other API calls and whether servicing the API call will require a new virtual resource to be provisioned, and
where cloud-resource consumption costs incurred by servicing the API call are billed by the cloud-management system to a client account;

the processor retrieving client data from a cloud-system data repository,
where the client data comprises: terms of a billing plan associated with the client account, an estimate of an amount of cloud resources expected to be consumed by servicing an API call of the particular type, and a relative cost of the amount of cloud resources;

the processor predicting as a function of the client data a billing cost that would be incurred by servicing the particular type of API call under the terms of the billing plan; and the processor embedding the billing cost as metadata into a response to the API call.

17. The computer program product of claim 16, further comprising:
the processor determining that the client application is configured to run in an emulation mode that does not require the cloud-management system to service GET and POST API calls;
the processor revising the API call by substituting HEAD calls for all GET and POST calls comprised by the intercepted API; and
the processor forwarding the revised API call to a cloud service.

18. The computer program product of claim 17,
where the predicted billing cost is a cost to service the intercepted API call, prior to the revising,
where the response is a response to the revised API call, comprising a header section, a status section, but no body section, and
where the header section comprises the embedded billing-cost data.

19. The computer program product of claim 16,
where the API call, under direction of a software developer of the client application, is generated by a plug-in component of an integrated development environment (IDE) within which the client application is running, and
where the plug-in component is provided by the cloud-management system.

20. The computer program product of claim 16, further comprising:
the processor adding the billing cost to a cumulative total of previously predicted billing costs associated with previous API calls made by the client application;
the processor storing the resulting total billing cost in a client API usage store that is associated with the client application; and
the processor determining whether the resulting total billing cost has exceeded a threshold value.

* * * * *